(12) United States Patent
Sondur et al.

(10) Patent No.: US 7,706,248 B2
(45) Date of Patent: Apr. 27, 2010

(54) MULTICARRIER RECEIVER AND METHOD FOR TIME-DELAY COMPENSATION IN A MULTI-USER UPLINK

(75) Inventors: Lakshmipathi Sondur, Karnataka (IN); Ashim Biswas, Bangalore (IN); Atanu Guchhait, West Bengal (IN)

(73) Assignee: Intel Corporation, Santa Clara, CA (US)

( * ) Notice: Subject to any disclaimer, the term of this patent is extended or adjusted under 35 U.S.C. 154(b) by 1337 days.

(21) Appl. No.: 11/172,452

(22) Filed: Jun. 29, 2005

(65) Prior Publication Data

US 2007/0002749 A1 Jan. 4, 2007

(51) Int. Cl.
*H04J 11/00* (2006.01)
*G01R 31/08* (2006.01)
*H04B 7/208* (2006.01)

(52) U.S. Cl. .................. 370/208; 370/252; 370/344

(58) Field of Classification Search ............... 370/203, 370/208, 252, 343, 344, 335, 319
See application file for complete search history.

(56) References Cited

U.S. PATENT DOCUMENTS

| | | | |
|---|---|---|---|
| 5,274,841 A | 12/1993 | Natarajan et al. | |
| 5,818,872 A | 10/1998 | Gupta | |
| 5,896,561 A | 4/1999 | Schrader et al. | |
| 6,229,799 B1 | 5/2001 | Caillerie et al. | |
| 6,504,834 B1 | 1/2003 | Fifield | |
| 6,560,209 B1 * | 5/2003 | Alamouti et al. | 370/330 |
| 6,847,313 B2 | 1/2005 | Biswas | |
| 6,947,505 B2 | 9/2005 | Learned | |
| 7,006,530 B2 | 2/2006 | Spinar et al. | |
| 7,286,617 B2 | 10/2007 | Vanderperren et al. | |
| 7,313,189 B2 * | 12/2007 | Yoshida et al. | 375/260 |
| 7,313,203 B2 | 12/2007 | Tubbax et al. | |
| 7,324,607 B2 | 1/2008 | Guchhait | |
| 7,327,800 B2 | 2/2008 | Oprea et al. | |
| 7,352,819 B2 | 4/2008 | Lakshmipathi | |
| 7,426,199 B2 | 9/2008 | Sondur et al. | |
| 7,466,964 B2 | 12/2008 | Sondur | |
| 7,480,497 B2 | 1/2009 | Biswas et al. | |
| 2002/0181390 A1 | 12/2002 | Mody et al. | |
| 2003/0152022 A1 | 8/2003 | Hosur | |

(Continued)

FOREIGN PATENT DOCUMENTS

EP 1107620 A2 6/2001

(Continued)

OTHER PUBLICATIONS

Biswas, A., et al., "Channel Estimation Techniques With Long Training Sequence for IEEE 802.11A", *2004 International Conference on Signal Processing & Communications (SPCOM '04)*, (2004), 136-139.

(Continued)

*Primary Examiner*—Nittaya Juntima
(74) *Attorney, Agent, or Firm*—Schwegman, Lundberg & Woessner, P.A.; Gregory J. Gorrie (57) ABSTRACT

Embodiments of System and Method for compensating for time-of-arrival differences between uplink packets in a Wireless Network are generally described herein. Other embodiments may be described and claimed.

21 Claims, 7 Drawing Sheets

U.S. PATENT DOCUMENTS

| | | | |
|---|---|---|---|
| 2004/0005010 A1 | 1/2004 | He et al. |
| 2004/0048584 A1 | 3/2004 | Vaidyanathan et al. |
| 2005/0058215 A1 | 3/2005 | Biswas |
| 2005/0111427 A1 | 5/2005 | Li et al. |
| 2005/0129101 A1 | 6/2005 | Stephens et al. |
| 2005/0144307 A1 | 6/2005 | Li et al. |
| 2005/0147115 A1 | 7/2005 | Li et al. |
| 2005/0195790 A1 | 9/2005 | Learned et al. |
| 2005/0281241 A1 | 12/2005 | Webster et al. |
| 2006/0014494 A1 | 1/2006 | Vanderperren et al. |
| 2006/0045062 A1 | 3/2006 | Gorokhov et al. |
| 2006/0045220 A1 | 3/2006 | Biswas |
| 2006/0120395 A1* | 6/2006 | Xing et al. ................ 370/431 |
| 2006/0222095 A1 | 10/2006 | Niu et al. |
| 2007/0002800 A1 | 1/2007 | Sondur et al. |
| 2007/0004337 A1 | 1/2007 | Biswas et al. |
| 2007/0004347 A1 | 1/2007 | Sondur |
| 2007/0104221 A1 | 5/2007 | Venkatachalam |
| 2007/0142089 A1 | 6/2007 | Roy et al. |
| 2007/0173203 A1 | 7/2007 | Fei et al. |
| 2008/0317149 A1 | 12/2008 | Sondur et al. |
| 2009/0041144 A1 | 2/2009 | Biswas et al. |

FOREIGN PATENT DOCUMENTS

| | | | |
|---|---|---|---|
| WO | WO-01/86993 A1 | 11/2001 |
| WO | WO-2005/053235 A1 | 6/2005 |
| WO | WO-2007/002805 A1 | 1/2007 |
| WO | WO-2007/002924 A1 | 1/2007 |

OTHER PUBLICATIONS

Cui, T., et al., "Robust Joint Frequency Offset and Channel Estimation for OFDM Systems", *IEEE 60th Vehicular Technology Conference (VTC 2004-Fall)*, vol. 1., (2004), 603-607.

Egashira, N., et al., "Improvement of CCI Compensation Accuracy Using Feedback Phase Tracking in MIMO-OFDM Systems", *IEEE Global Telecommunications Conference (GLOBECOM '04)*, vol. 2, (2004), 923-927.

Frenkiel, R. H., et al., "The Infostations Challenge: Balancing Cost and Ubiquity in Delivering Wireless Data", *IEEE Personal Communications*, vol. 7, (Apr. 2000), 66-71.

Moose, P. H., "A Technique for Orthogonal Frequency Division Multiplexing Frequency Offset Correction", *IEEE Transactions on Communications*, 42(10), (Oct. 1994), 2908-2914.

Pun, M., et al., "An EM-Based Joint Maximum Likelihood Estimation of Carrier Frequency Offset and Channel for Uplink OFDMA Systems", *IEEE 60th Vehicular Technology Conference (VTC 2004)*, (2004), 598-602.

Yu, C.-Y., et al., "Design and Simulation of a MIMO OFDM Baseband Transceiver for High Throughput Wireless LAN", *Proceedings, 2004 IEEE Asia-Pacific Conference on Circuits and Systems*, vol. 1, (2004), 205-208.

"U.S. Appl. No. 11/171,643 Response filed Jun. 9, 2008 to Non-Final Office Action mailed Apr. 14, 2008", 19 pgs.

"U.S. Appl. No. 11/171,643 Supplemental Notice of Allowability mailed Oct. 15, 2008", 7 pgs.

"U.S. Appl. No. 11/172,449, Notice of Allowance mailed Aug. 11, 2008", 5 pgs.

"U.S. Appl. No. 11/172,451 Notice of Allowance mailed May 9, 2008.", 6 pgs.

"U.S. Appl. No. 12/190,009 Non-Final Office Action mailed May 29, 2009", 17 pgs.

"U.S. Appl. No. 11/171,643 Notice of Allowance mailed Sep. 5, 2008", 11 pgs.

"Appl. No. 12/190,009, Notice of Allowance mailed Nov. 10, 2009", 6 pgs.

"Appl. No. 12/190,009, Response filed Aug. 24, 2009 to Non Final Office Action mailed May 29, 2009", 9 pgs.

\* cited by examiner

FIG. 5A 516
517
LTF 1= $\{f_0, f_3, f_6, \ldots, f_{60}\}$ 518
519
LTF 2= $\{f_1, f_4, f_7, \ldots, f_{61}\}$ 520
521
LTF 3= $\{f_2, f_5, f_8, \ldots, f_{62}\}$ 522
523
LTF 4= $\{f_3, f_6, f_9, \ldots, f_{63}\}$

*FIG. 5B*

MULTICARRIER RECEIVER AND METHOD FOR TIME-DELAY COMPENSATION IN A MULTI-USER UPLINK

CROSS REFERENCE TO RELATED APPLICATIONS

This patent application is related to U.S. patent application Ser. No. 11/172,449, filed Jun. 29, 2005, now issued as U.S. Pat. No. 7,466,964, U.S. patent application Ser. No. 11/172,451, filed Jun. 29, 2005, now issued as U.S. Pat. No. 7,426,199, and U.S. patent application Ser. No. 11/171,643, filed Jun. 29, 2005, now issued as U.S. Pat. No. 7,480,497.

TECHNICAL FIELD

Some embodiments of the present invention pertain to multicarrier communication systems. Some embodiments of the present invention pertain to wireless networks.

BACKGROUND

In a multicarrier communication system, such as a system that uses orthogonal frequency division multiplexing (OFDM), orthogonal subcarriers are used to convey data. In some wireless networks, several wireless communication stations may communicate with one receiving station, such as an access point. One difficulty with receiving communications concurrently from more than one communication station is that there are slight differences in the arrival time of the packets from the different stations. These slight time-of-arrival (TOA) differences may degrade a receiver's performance including its ability to separate the data from each transmitting station. Thus there are general needs for compensating for the effects of time-of-arrival differences when receiving from multiple transmitting stations.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
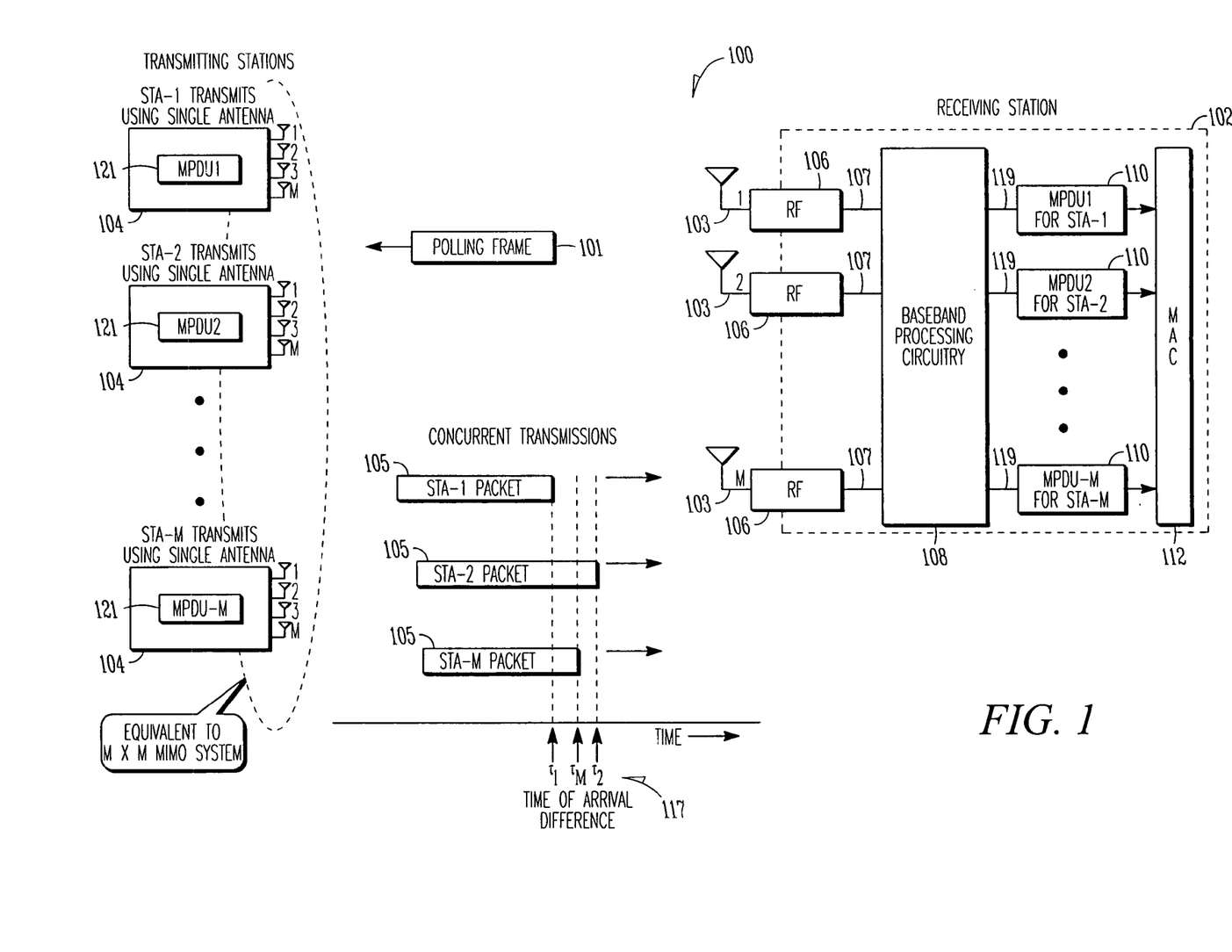
FIG. 1 illustrates communications between a receiving station and transmitting stations over a multi-user uplink in accordance with some embodiments of the present invention.

FIG. 1 illustrates communications between a receiving station and transmitting stations over a multi-user uplink in accordance with some embodiments of the present invention. Wireless network 100 includes receiving station 102 and one or more transmitting stations 104. Receiving station 102 may provide for communications between associated transmitting stations 104 and may allow associated transmitting stations 104 to communicate with one or more external networks, such as the Internet. In some embodiments, receiving station 102 and transmitting stations 104 may comprise multiple-input multiple-output (MIMO) communication stations which use a plurality of antennas for communicating. Although in FIG. 1, transmitting stations 104 and receiving station 102 are illustrated with four antennas, the scope of the invention is not limited in this respect. In some embodiments, transmitting stations 104 and receiving station 102 may have as few as two antennas and up to ten more antennas.

In accordance with some embodiments of the present invention, receiving station 102 employs a multi-user uplink to receive uplink packets concurrently from more than one of transmitting stations 104. In these embodiments, latency may be reduced for applications operating on transmitting stations 104. The applications may include time-sensitive applications, such as voice over IP (VoIP) or streamed video applications, which may have time-sensitive packet transmission requirements. In some embodiments, the applications may include applications having quality-of-service (QOS) level requirements. Quality-of-service level requirements may include data rate requirements, error rate requirements and/or packet priority requirements. In some embodiments, the quality-of-service level requirements may be based on the information content of the communications. The applications may also include less time-sensitive applications, such as applications that communicate best-effort traffic as well as background traffic. Although some embodiments of the present invention are described reducing latency for time-sensitive applications, the scope of the invention is not limited in this respect, as some embodiments are equally applicable to almost any communication application operating on a transmitting or a receiving station. In some embodiments, time-sensitive applications may refer to any communication application having a packet-latency requirement.

In some embodiments, receiving station 102 may concurrently receive uplink packets 105 through two or more receive antennas 103 from two or more transmitting stations 104 on the same frequency subcarriers of a multicarrier communication channel. In these embodiments, receiving station 102 may internally separate the uplink data transmitted by the two or more transmitting stations 104 using channel estimates for each transmitting station from which a transmission is received. In some embodiments, receiving station 102 may take advantage of the antenna diversity resulting from differently located transmitting stations 104. These embodiments are discussed in more detail below.

In some embodiments, transmitting stations 104 are polled to simultaneously respond. Receiving station 102 may transmit downlink polling frame 101 to poll transmitting stations 104. The response packets transmitted by transmitting stations 104 may comprise uplink packets 105 and may be received by receiving station 102 with slightly different delays due to different distances between transmitting stations 104 and receiving station 102. In some embodiments, each transmitting station 104 may use a known or standard preamble, such as an IEEE 802.11n preamble referenced below, so that transmitting stations 104 together may form a virtual MIMO system. Receiving station 102 may have an equal or greater of antennas 103 than the number of selected transmitting stations 104 to resolve the spatial streams transmitted by the transmitting stations. The preambles may include a short-training sequence (STS) and a long-training sequence (LTS), although the scope of the invention is not limited in this respect as any known preamble may used.

In accordance with some embodiments, each transmitting station, 104 may use a single transmit antenna to transmit an uplink packet. Receiving station 102, on the other hand, may use at least as many receive antennas to receive the uplink packets as the number of transmitting stations 104 transmitting uplink packets. In FIG. 1, receiving station 102 is illustrated as having M receive antennas to receive uplink packets from up to M transmitting stations 104.

In accordance with some embodiments of the present invention, multicarrier receiving station 102 determines time-of-arrival differences 117 between uplink packets 105 received from transmitting stations 104 and compensates Fourier coefficients for each of transmitting stations 104 based on time-of-arrival differences 117. Uplink packets 105 may be received concurrently from each of transmitting stations 104 on subcarriers of a multicarrier communication channel. Each transmitting station 104 may use the same set of subcarriers to transmit a data portion of the uplink packet. In some embodiments, receiving station 102 may perform a plurality of correlations on baseband samples generated from the received uplink packets to determine time-of-arrival differences 117. The correlations may be performed using preambles of each uplink packet 105. The preambles may be unique to each transmitting stations 104.

In some embodiments, the compensation of the Fourier coefficients may be performed on a packet-by-packet basis. Accordingly, as transmitting stations 104 move with respect to transmitting station 102, the changing time-of-arrival differences may be taken into account on a per-packet basis, although the scope of the invention is not limited in this respect.

In some embodiments, transmitting stations 104 and receiving station 102 may be part of separate wireless communication devices that may communicate multicarrier communication signals, such as orthogonal frequency division multiplexed (OFDM) communication signals, or orthogonal frequency division multiple access (OFDMA) communication signals, although the scope of the invention is not limited in this respect. The multicarrier signals may be communicated over a multicarrier communication channel which may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have an integer number of cycles within a symbol period, although the scope of the invention is not limited in this respect. In some alternate embodiments, transmitting stations 104 and receiving station 102 may communicate spread-spectrum signals, although the scope of the invention is not limited in this respect.

In some embodiments, receiving station 102 may be referred to as a managing or coordinating wireless communication device. Examples of managing or coordinating wireless communication devices may include wireless access points (APs), Wireless Fidelity (WiFi) communication stations, Worldwide Interoperability for Microwave Access (WiMax) communication stations, or broadband communication stations, although the scope of the invention is not limited in this respect as receiving station 102 may be almost any wireless communication device. In some embodiments, transmitting stations 104 may be referred to as communication stations (STAs), such as WiFi, WiMax, or broadband communication stations, although the scope of the invention is not limited in this respect.

In some embodiments, the frequency spectrums for the multicarrier communication signals communicated by transmitting stations 104 and receiving station 102 may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

Antennas 103 and the antennas of transmitting stations 104 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

In some embodiments, stations 102 and 104 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards for wireless local area networks (WLANs), although stations 102 and 104 may also be suitable to transmit and/or receive communications in accordance with other techniques. In some broadband and WiMax embodiments, stations 102 and 104 may transmit and receive broadband wireless communications in accordance with the IEEE 802.16(e) standards for wireless metropolitan area networks (WMANs). For more information with respect to IEEE 802.11 and the IEEE 802.16 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some embodiments, stations 102 and/or 104 may be part of portable wireless communication devices, such as personal digital assistants (PDAs), laptop or portable computers with wireless communication capability, web tablets, wireless telephones, wireless headsets, pagers, instant messaging devices, digital cameras, access points, televisions or other device that may receive and/or transmit information wirelessly.

Station 102 is referred to as a receiving station and stations 104 are referred to as transmitting stations for convenience. The terms transmitting and receiving are not meant to be limiting in any way. In some embodiments, receiving station 102 and transmitting stations 104 may include both transmitting and receiving functionality.

As illustrated in FIG. 1, receiving station 102 may include radio-frequency (RF) front-end circuitry 106 associated with each antenna 103 to downconvert and digitize the received signals to generate baseband samples 107. Receiving station 102 may also include baseband processing circuitry 108 to process baseband samples 107 from each antenna and generate data streams 119. In some embodiments, each data stream 119 may be associated with a spatial data stream transmitted by one of transmitting stations 104. The operations of baseband processing circuitry 108 are discussed in more detail below. Receiving station 102 may also include circuitry to generate data units 110, such as media-access control (MAC) layer protocol data units (MPDUs), for each transmitting station for media-access control (MAC) layer 112. Data units 110 may correspond respectively to data units 121 generated by a MAC layer of transmitting stations 104. In some embodiments, illustrated in FIG. 1, each transmitting station 104 may transmit at a particular data rate (e.g., $r_b$ Mega-bits per second (Mbps)) and receiving station 102 may receive at M times that data rate (e.g., M×$r_b$ Mbps), although the scope of the invention is not limited in this respect.

Figure 2:
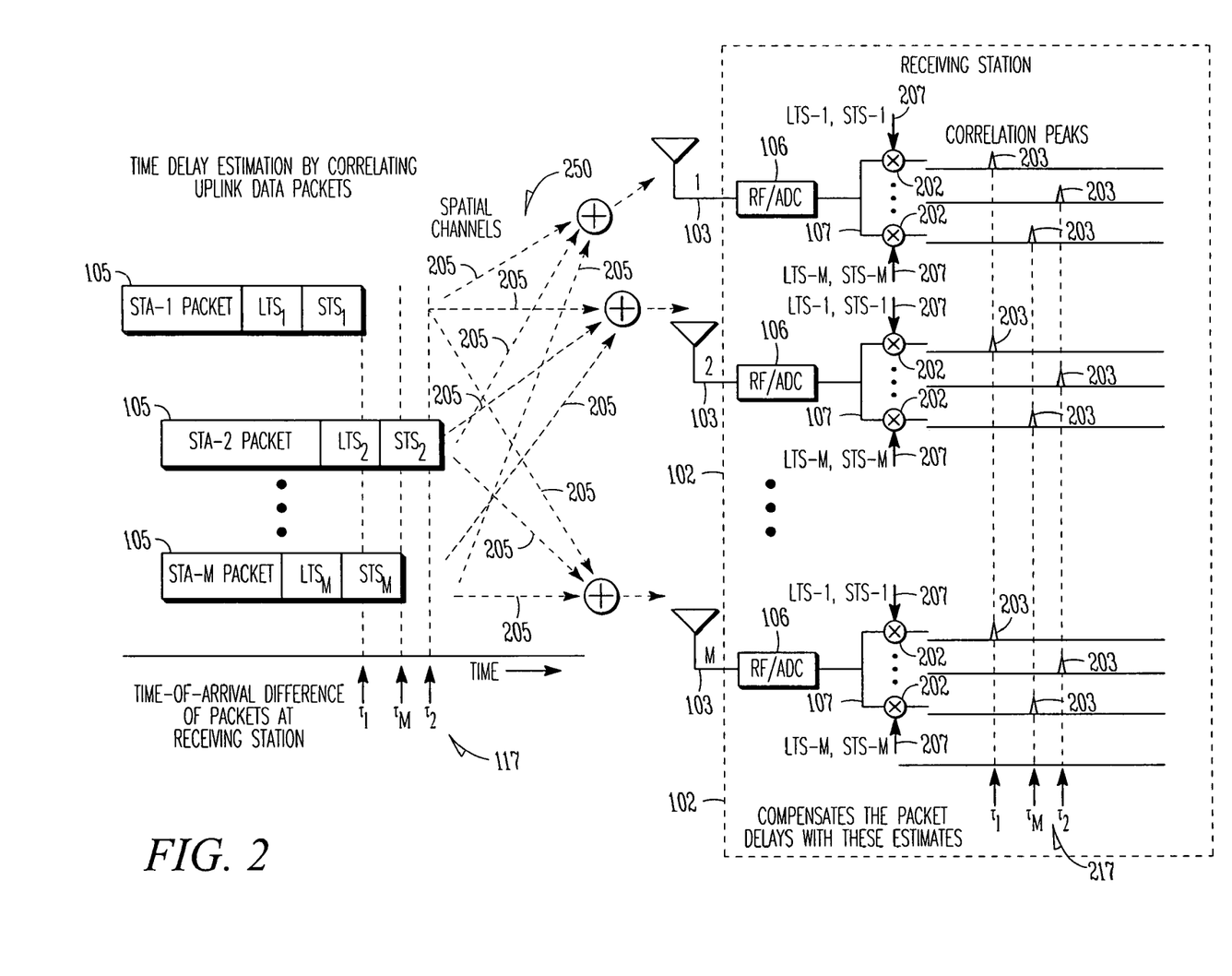
FIG. 2 illustrates time-delay estimating in accordance with some embodiments of the present invention.

FIG. 2 illustrates time-delay estimating in accordance with some embodiments of the present invention. As illustrated in FIG. 2, uplink packets 105 are concurrently transmitted by transmitting stations 104 (FIG. 1) through multicarrier channel 250. Because the data portions of uplink packets 105 are transmitted by each transmitting station 104 (FIG. 1) on the same subcarriers, uplink packets 105 are mixed-up and combined in the channel and components of each uplink packet 105 are received at each of receive antennas 103. A spatial channel 205 exists between each transmitting station and each receive antenna 103. Correlation peaks 203 may be generated by performing correlations 202 on baseband samples 107 using preambles 207. For baseband samples 107 generated from each receive antenna 103, a correlation 202 may be performed for each transmitting station 104 (FIG. 1) using a preamble unique to each transmitting station 104. Preambles 207 for a first transmitting station (i.e., STA-1) are illustrated as LTS-1 and STS-1 and preambles from the $m^{th}$ transmitting station (i.e., STA-M) are illustrated as LTS-M and STS-M. The number of transmitting stations M may range from a few as two to up to ten or more. Although preambles 207 are illustrated as LTS and STS, the scope of the invention is not limited in this respect as any known orthogonal preambles may be used.

As illustrated, time-of-arrival difference estimates 217 may be determined for the different transmitting stations from correlation peaks 203 and may be used to compensate Fourier coefficients discussed in more detail below.

Figure 3A:
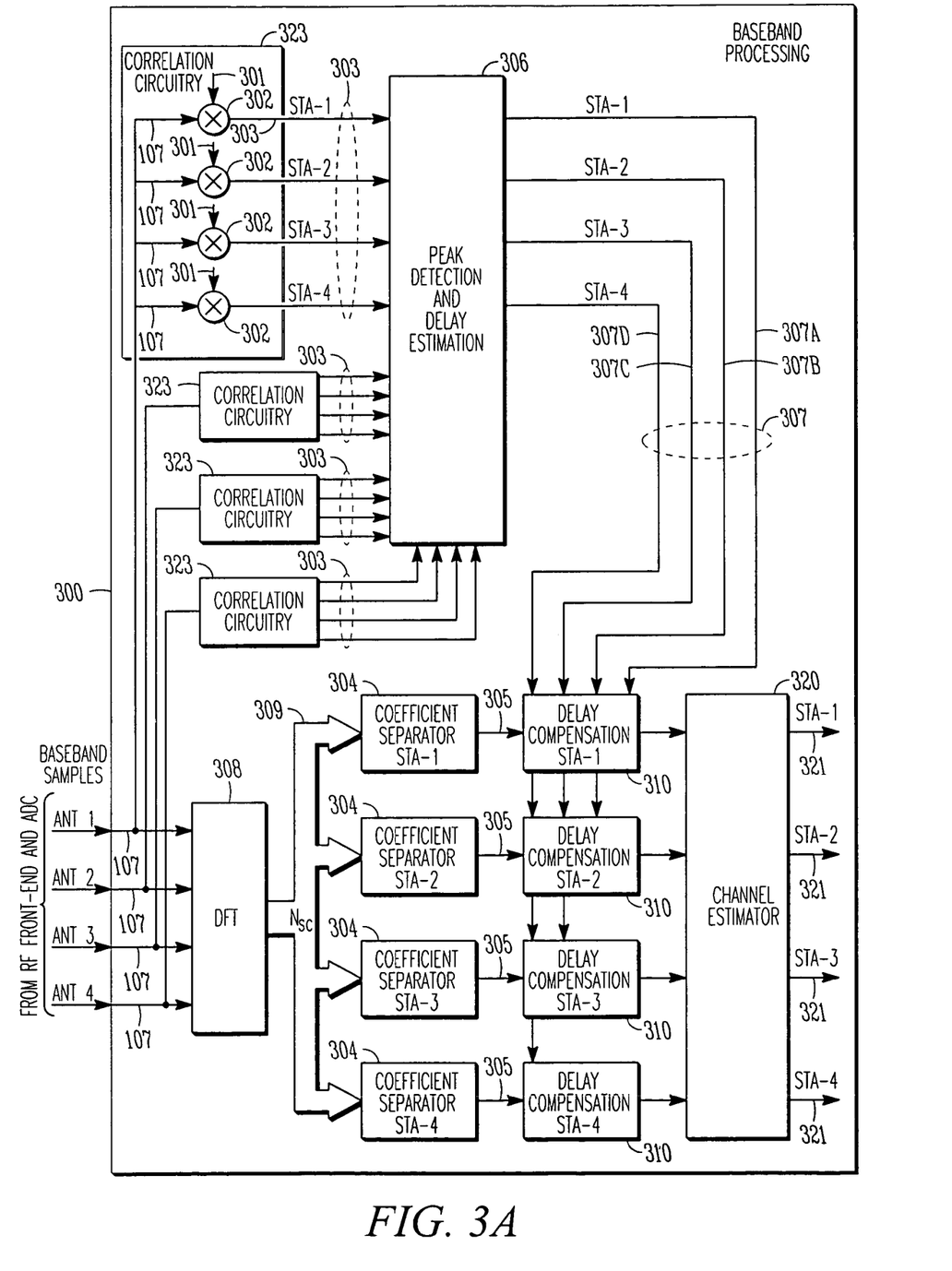
FIG. 3A is a block diagram of baseband processing circuitry of a receiving station in accordance with some embodiments of the present invention.
Figure 3B:
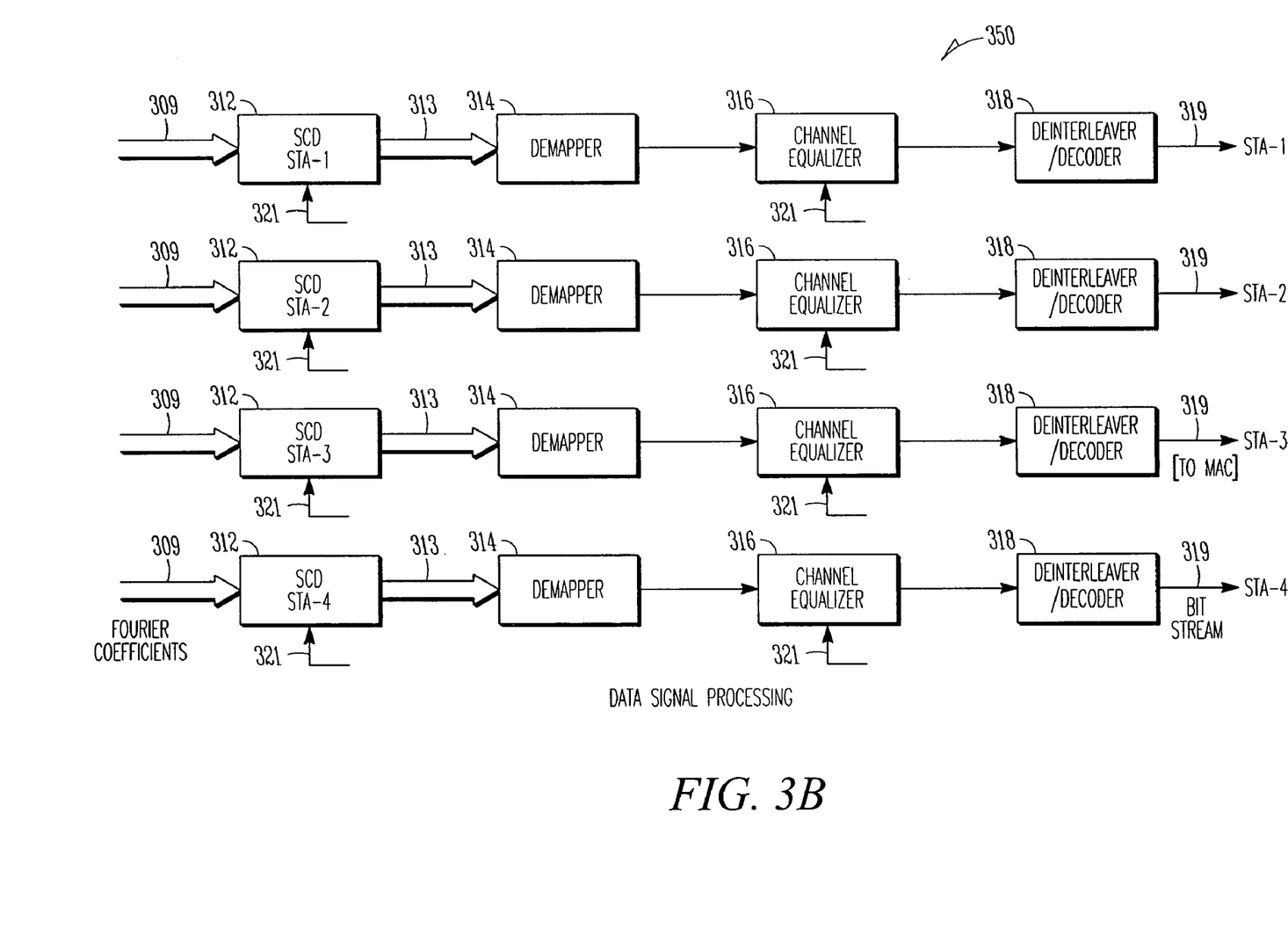
FIG. 3B is a data signal processing portion of baseband processing circuitry in accordance with some embodiments of the present invention.

FIG. 3A is a block diagram of baseband processing circuitry of a receiving station in accordance with some embodiments of the present invention. Baseband processing circuitry 300 may correspond to baseband processing circuitry 108 (FIG. 1) of receiving station 102. FIG. 3B illustrates data signal processing portion 350 of baseband processing circuitry 300 (FIG. 3A) in accordance with some embodiments of the present invention. Baseband processing circuitry 300 may generate separated bit streams 319 (FIG. 3B) for the MAC layer from sets of baseband samples 107.

Receiver front-end circuitry 106 (FIG. 1) generates baseband samples 107 from uplink packets 105 (FIG. 1) received concurrently from transmitting stations 104 (FIG. 1). Baseband processing circuitry 108 may determine time-of-arrival differences 307 between signals received from the transmitting stations and may compensate Fourier coefficients 309 associated with each of the transmitting stations based on time-of-arrival differences 307.

In some embodiments, baseband processing circuitry 300 may include a plurality of correlators 302 to perform correlations on baseband samples 107 (FIG. 1) to determine the time-of-arrival differences. Each correlator 302 may perform a correlation with preamble 301 of the uplink packet associated with one of the transmitting stations 104 (FIG. 1). In some embodiments, each transmitting station 104 (FIG. 1) may transmit a unique preamble allowing each of correlators 302 to generate a correlation peak associated with a particular transmitting station. In some embodiments, the preambles of each transmitting station 104 (FIG. 1) may be transmitted on different frequency subcarriers. In some embodiments, the preambles may also comprise one or more training sequences, such as a short-training sequence (i.e., STS) or a long training sequence (i.e., LTS), although the scope of the invention is not limited in this respect.

In some embodiments, baseband processing circuitry 300 may include peak detection and delay-estimation circuitry 306 to identify correlation peaks 203 (FIG. 2) and to determine time-of-arrival differences 307 from correlation outputs 303.

In some embodiments, baseband processing circuitry 300 also includes Fourier transform circuitry 308 to generate Fourier coefficients 309 by performing a discrete Fourier transform (DFT) on baseband samples 107. In some embodiments, Fourier transform circuitry 308 may generate a Fourier coefficient for each subcarrier of a plurality of subcarriers of the multicarrier communication channel. In some embodiments, the number of subcarriers (Nsc) may range from as few as 64 or less to as great as 1024 and greater. In some embodiments, the DFT may be a fast Fourier transform (FFT) although the scope of the invention is not limited in this respect.

In some embodiments, baseband processing circuitry 300 also includes a plurality of coefficient separators 304. Each coefficient separator 304 may separate Fourier coefficients 309 associated with a preamble transmitted by one the transmitting stations. Each transmitting station 104 (FIG. 1) may transmit a portion of a preamble (i.e., STS) on pre-assigned or predetermined subcarriers of the multicarrier communication channel allowing coefficient separators 304 to separate the subcarriers of one of the transmitting stations. In some embodiments, the output of each coefficient separator 304 may comprise the subcarriers of the multicarrier communication channel used by the associated transmitting station to transmit the preamble.

Baseband processing circuitry 300 may also include delay-compensation circuitry 310 to offset separated frequency-domain Fourier coefficients 305 based on time-of-arrival differences 307 associated with each transmitting station. In some embodiments, delay-compensation circuitry 310 rotates the phase (i.e., phase-shifts) of Fourier coefficients 305 an amount opposite to a time-of arrival delay estimate associated with one of the time-of-arrival differences 307. In some embodiments, the earliest arriving station may be taken as a reference, and the packets of the other stations may be delayed with respect to the reference station. In this way, delay-compensation circuitry 310 may compensate for the delay of the delayed stations and refrain from compensating for the reference station. Each of delay-compensation circuitry 310 illustrated may be associated with a particular transmitting station 104 (FIG. 1). The delay compensated Fourier components provided by delay compensation circuitry 310 may be used by channel estimator 320 to generate channel estimates 321 for each transmitting station 104 (FIG. 1) (i.e., STA-1, STA-2, STA-3 and STA-4).

As illustrated in FIG. 3A, time-of-arrival difference 307A may be the time-difference associated with a first transmitting station (i.e., STA-1), time-of-arrival difference 307B may be the time-difference associated with a second transmitting station (i.e., STA-2), time-of-arrival difference 307C may be the time-difference associated with a third transmitting station (i.e., STA-3) and time-of-arrival difference 307D may be the time-difference associated with a fourth transmitting station (i.e., STA-4). In some embodiments, the reference station may have no time delay, although the scope of the invention is not limited in this respect.

In some embodiments, receiver circuitry 106 (FIG. 1) may generate a set of baseband samples 107 for each of a plurality of receive antennas 103 (FIG. 1) and Fourier transform circuitry 308 may generate Fourier coefficients 309 from all the sets of baseband samples 107. In FIG. 3A, four sets of baseband samples 107 are illustrated corresponding to four receive antennas (i.e., ANT-1, ANT-2, ANT-3 and ANT-4). In some of these embodiments, baseband processing circuitry 300 performs correlations on each set of baseband samples using preambles associated with each transmitting station and peak detection and delay-estimation circuitry 306 generates time-of-arrival differences 307 for each transmitting station 104 (i.e., STA-1, STA-2, STA-3 and STA-4). In these embodiments, baseband processing circuitry 300 may include correlation circuitry 323 for each antenna path which may generate correlation outputs 303 for each station for each antenna path. In these embodiments, peak detection and delay-estimation circuitry 306 may generate time-of-arrival differences 307 for each transmitting station by averaging the time-of-arrival difference estimates generated from each antenna path.

Figure 5A:
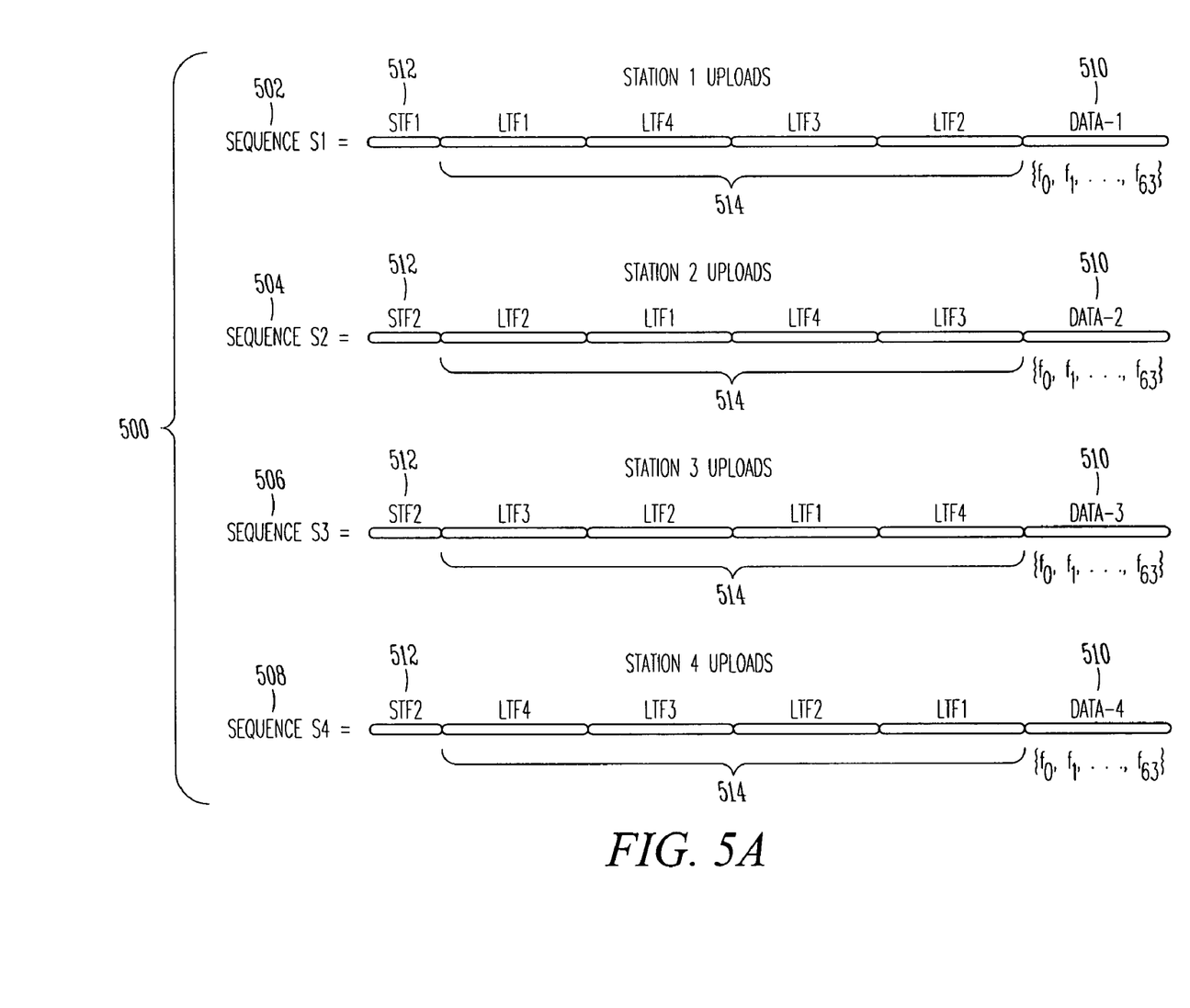
FIG. 5A illustrates fields of uplink packets transmitted by four communication stations in accordance with some embodiments of the present invention.
Figure 5B:
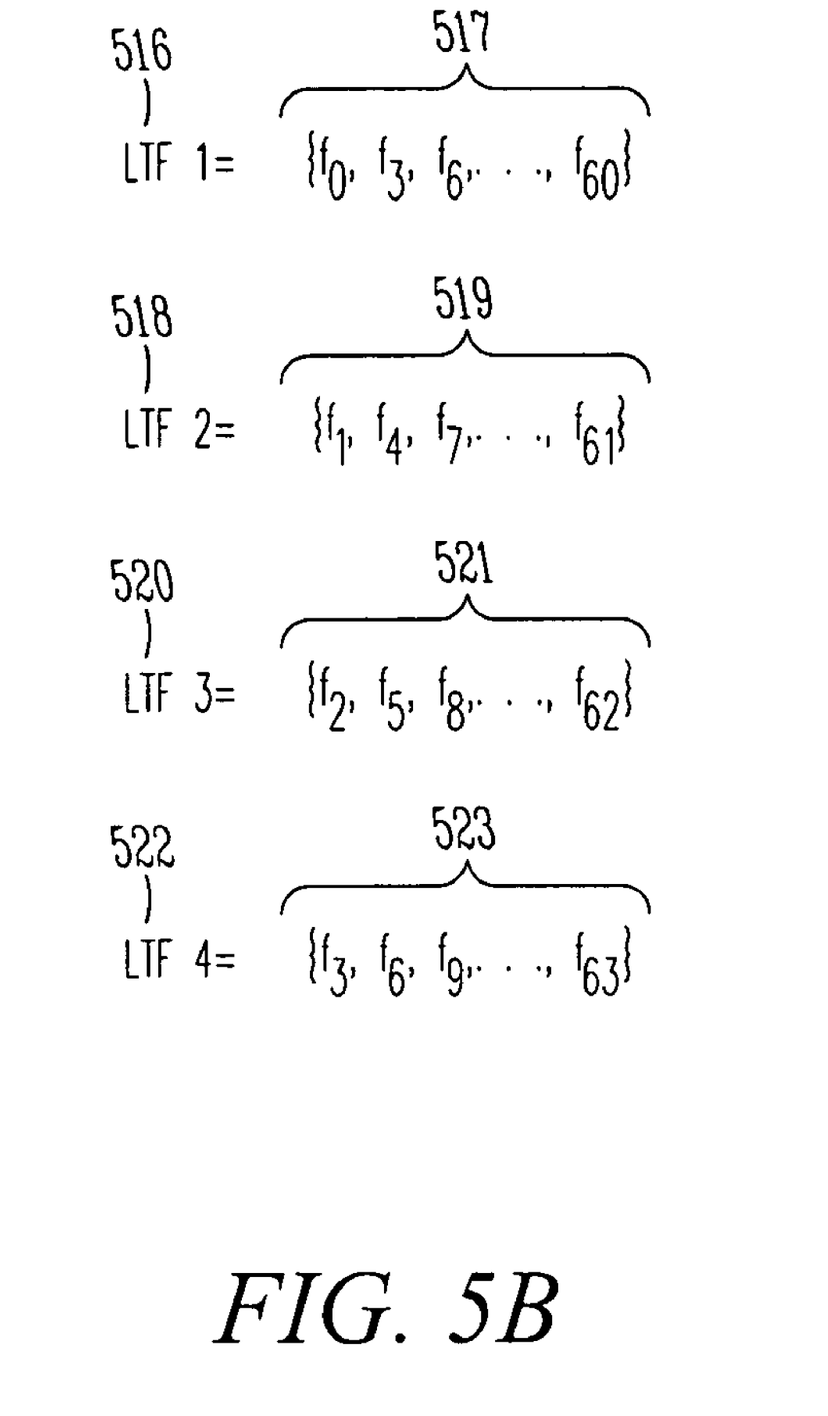
FIG. 5B illustrates examples interleaved frequencies of long-training fields of uplink packets in accordance with some embodiments of the present invention.

In some embodiments, uplink packets 105 (FIG. 1) may be received on a plurality of subcarriers of a multicarrier communication channel and each transmitting station 104 (FIG. 1) may transmit a data portion of the uplink packet on the same subcarriers as the other transmitting stations 104 (FIG. 1). Each transmitting station may also transmit a portion of the preamble (e.g., the STS) of the uplink packet using different sets of subcarriers of the multicarrier communication channel. In these embodiments, the portion of the preamble (e.g., the STS) transmitted by each transmitting station 104 (FIG. 1) may be orthogonal to the preamble portion transmitted by other transmitting stations 104 (FIG. 1). The sets of subcarriers may be known allowing separate correlations to be performed for each transmitting station 104 (FIG. 1). In some embodiments, each transmitting station may further transmit a second preamble portion (e.g., the LTS) of the uplink packet using subcarriers in a frequency interleaved sequence with the subcarriers used by the other transmitting stations in transmitting the second preamble portion. Examples of these preambles are illustrated in FIGS. 5A and 5B discussed below.

In some embodiments, baseband processing circuitry 300 also may include data signal processing portion 350 illustrated in FIG. 3B. Data signal processing portion 350 operates on Fourier coefficients 309 to separate and decode the data transmitted by each transmitting station 104 (FIG. 1) to generate one of bit streams 319 for each station. Bit streams 319 may correspond with the data portions of the uplink packets transmitted by an associated transmitting station. In some embodiments, data signal processing portion 350 may include spatial-channel decoders (SCD) 312 to decode and separate the data separately transmitted by each transmitting station 104 (FIG. 1) on the same frequency subcarriers of the multicarrier communication channel using channel estimates 321 provided by channel estimator 320 (FIG. 3A). In some embodiments, data signal processing portion 350 may also include demapping circuitry 314 which may demap quadrature-amplitude modulated (QAM) symbols of decoded spatial data streams 313. In some embodiments, data signal processing portion 350 may also include channel equalizer 316, which may also use channel estimates 321 provided by channel estimator 320 (FIG. 3A) to perform a channel equalization, and de-interleaving and decoding circuitry 318 to process the bits provided by equalizer 316 to generate bit streams 319 corresponding to the data transmitting by each transmitting station 104 (FIG. 1).

In some alternate embodiments, the operations performed by delay-compensation circuitry 310 (FIG. 3A) may be performed as part of the operations performed by channel equalizers 316 (FIG. 3B), although the scope of the invention is not limited in this respect.

Although baseband processing circuitry 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of baseband processing circuitry 300 may refer to one or more processes operating on one or more processing elements. Although baseband processing circuitry 300 is an example embodiment illustrating four receive antennas that are used to receive uplink packets concurrently from four transmitting stations 104 (FIG. 1), the scope of the invention is not limited in this respect.

Figure 4:
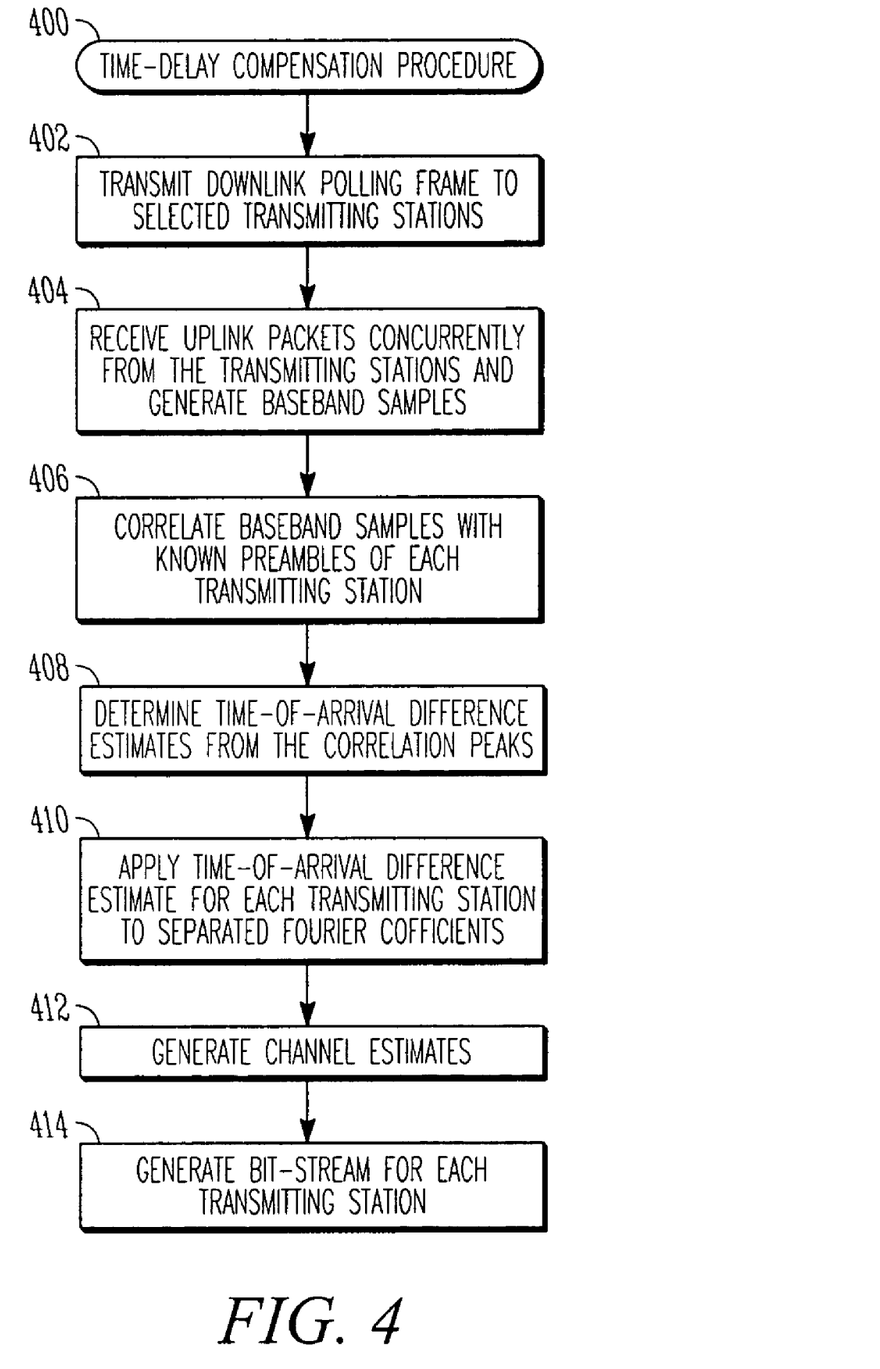
FIG. 4 is a flow chart of a time-delay compensation procedure in accordance with some embodiments of the present invention.

FIG. 4 is a flow chart of a time-delay compensation procedure in accordance with some embodiments of the present invention. Procedure 400 may be performed by receiving station 102 (FIG. 1) to compensate for time-of-arrival differences between concurrently received uplink packets transmitted by more than one transmitting station 104 (FIG. 1). Procedure 400 may generate separated data streams from each transmitting station 104 (FIG. 1).

In operation 402, receiving station 102 (FIG. 1) transmits downlink polling frame 101 (FIG. 1) to selected transmitting stations 104 (FIG. 1). In some embodiments, the receiving station may initiate a point coordination function (PCF) by transmitting the downlink polling frame. In some embodiments, the downlink polling frame may include the address of the selected transmitting stations (i.e., their receiver addresses (RAs)). The downlink polling frame may instruct the selected transmitting stations to respond simultaneously. In some embodiments, the downlink polling frame may also identify the subcarrier frequencies that each transmitting station may use to transmit the preamble of the uplink packet. For example, the downlink polling frame may indicate different sets of subcarriers for transmission of the STS and may indicate a different frequency interleaving pattern for each station to transmit the LTS.

In operation 404, the receiving station concurrently receives the uplink data packets from the transmitting stations, performs a down-conversion on the received signals and generates digital time-domain baseband samples, such as baseband samples 107 (FIG. 3A). In some embodiments, sets of baseband samples may be generated for each receive antenna of the receiving station. The number of receive antennas used to generate the baseband samples should be at least as great as the number of transmitting stations that were polled to concurrently transmit uplink packets. The baseband samples from each antenna may include components of the uplink packets from each transmitting station that were mixed-up in the channel.

Operation 406 comprises correlating the baseband samples with the known preambles of each transmitting station to generate correlation peaks, such as correlation peaks 203 (FIG. 2).

Operation 408 comprises determining time-of-arrival difference estimates, such as time-of-arrival difference estimates 217 (FIG. 2), from the correlation peaks. In some embodiments, the earliest con-elation peak may be treated as the reference and delay estimates may be determined from the correlation peaks from the other stations with respect to the reference. In some embodiments, time-of-arrival difference estimates may be generated for each transmitting station by averaging the time-of-arrival difference estimates generated from the signals of different antennas 103 (FIG. 1), although the scope of the invention is not limited in this respect.

Operation 410 comprises applying a time-of-arrival difference estimate for each transmitting station to separated Fourier coefficients. Operation 410 may be performed by delay-compensation circuitry 310 (FIG. 3A) which may rotate the separated Fourier coefficients by an amount opposite to the time-of-arrival difference estimate for each transmitting station. In some embodiments, this opposite phase rotation may be referred to as a de-rotation. In some embodiments, the amount of rotation may comprise a phase-shift defined by $e^{j2\pi nTs}$, in which n is the delay estimate in terms of samples and Ts is the sampling time used to generate baseband samples 107 (FIG. 1). In some embodiments, delay-compensation circuitry 310 (FIG. 3A) associated with the reference station may refrain from compensating the separated Fourier coefficients. The separated Fourier coefficients may be generated by coefficient separators 304 (FIG. 3A) based on the particular subcarriers a transmitting station used to transmit a preamble portion, such as the STS.

Operation 412 comprises generating channel estimates based on the time-compensated separated Fourier coefficients generated in operation 410. Operation 412 may be performed by channel estimator 320 (FIG. 3A).

Operation 414 comprises generating a bit stream for each transmitting station. The bit streams may correspond to the data transmitted in a data portion of the uplink packet. Operation 412 may be performed by spatial channel decoders 312 (FIG. 3B), demappers 314 (FIG. 3B), equalizers 316 (FIG. 3B) and/or decoder/deinterleavers 318 (FIG. 3B) to generate bit streams 319 (FIG. 3B) and may use the channel estimates generated in operation 412.

Although the individual operations of procedure 400 are illustrated and described as separate operations, one or more of the individual operations may be performed concurrently, and nothing requires that the operations be performed in the order illustrated.

FIGS. 5A and 5B illustrate uplink transmissions 500 by four transmitting stations in accordance with embodiments of the present invention. The transmitting stations may correspond to four transmitting stations 104 (FIG. 1) that may communicate over a multi-user uplink with an access point or managing communication station, such as receiving station 102 (FIG. 1). Transmissions 502 may be transmitted by a first transmitting station (i.e., station 1) and may comprise sequence S1, transmissions 504 may be transmitted by a second transmitting station (i.e., station 2) and may comprise sequence S2, transmissions 506 may be transmitted by a third transmitting station (i.e., station 3) and may comprise sequence S3, and transmissions 508 may be transmitted by a forth transmitting station (i.e., station 5) and may comprise sequence S4.

In some embodiments, based on the information in polling frame 101 (FIG. 1), each transmitting station 104 (FIG. 1) may generate frequency-domain components of first training field 512 (FIG. 5A) of uplink packet 105 (FIG. 1) using a predetermined set of subcarriers. Each transmitting station 104 (FIG. 1) polled may be assigned different frequency subcarriers for the first training field. In some embodiments, based on the information in polling frame 101 (FIG. 1), each transmitting station 104 (FIG. 1) may generate the frequency-domain components of second training field 514 (FIG. 5A) of its uplink packet 105 using sets of frequency-interleaved subcarriers. In some embodiments, transmitting station 104 (FIG. 1) may also generate the frequency-domain components of data field 510 (FIG. 5A) of its uplink packet 105 (FIG. 5) using all data subcarriers. Each transmitting station 104 (FIG. 1) may transmit the data field of the station's uplink packet on the same frequency subcarriers on subcarriers of the same frequencies.

In some embodiments, each station may transmit short training field (STF) 512, illustrated as STF1, STF2, STF3 and STF4, following by long training field (LTF) 514. The short-training field may include a short-training sequence (STS) and the long training field may include a long-training sequence (LTS) discussed above. Long training field 514 comprises a plurality of frequency interleaved training fields 516, 518, 520 and 522 illustrated in FIG. 5B as LTF1, LTF2, LTF3 and LTF4. As shown in FIG. 5B, each of frequency interleaved training fields 516, 518, 520 and 522 comprise a set of frequency-interleaved subcarriers, which in this example, comprise frequency subcarriers between 0 and 63, although the scope of the invention is not limited in this respect. In this way LTF1 516 may be transmitted in subcarriers 517, LTF2 518 may be transmitted in subcarriers 519, LTF3 520 may be transmitted in subcarriers 521 and LTF4 522 may be transmitted in subcarriers 523. In some embodiments, the subcarriers of long training field 514 may comprise sets of orthogonal subcarriers 517, 519, 521 and 523 illustrated in FIG. 5B.

FIG. 5A also illustrates the transmission of data field 510 by each of the transmitting stations. In these example embodiments, all four transmitting stations may transmit their data simultaneously during data field 510 on the same frequency subcarriers. For example, as illustrated, station 1 may transmit data-1 on frequency subcarriers $f_o, f_1, f_2 \ldots f_{63}$ at about the same time station 2 transmits data-2 on frequency subcarriers $f_o, f_1, f_2 \ldots f_{63}$, at about the same time station 3 transmits data-3 on frequency subcarriers $f_o, f_1, f_2 \ldots f_{63}$, and at about the same time station 5 transmits data-4 on frequency subcarriers $f_o, f_1, f_2 \ldots f_{63}$. Although FIGS. 5A and 5B illustrate example embodiments that use 64 subcarrier frequencies, the scope of the invention is not limited in this respect. In some embodiments, up to several hundred or more subcarrier frequencies may be used. Although FIGS. 5A and 5B illustrate example embodiments of four transmitting stations simultaneously uplinking to a receiving station, the scope of the invention is not limited in this respect as LIP to ten or more transmitting stations may be configured to transmit to a receiving station over a multi-user uplink.

In some embodiments, polling frame 101 (FIG. 1) may be transmitted with a single transmit antenna by receiving station 102 (FIG. 1). In these embodiments, polling frame 101 (FIG. 1) may by similar to a conventional or legacy packet format, however the single polling station address may be replaced with tip to four or more polling station addresses indicating that these stations are being polled and also indicating that these polled stations are to simultaneous uplink packets by using sequences, such as S1, S2, S3 and S4 in an example embodiment of four stations. The sequences may correspond to the polling station addresses in polling frame 101 (FIG. 1). In these embodiments, the polling frame may be similar to a legacy polling frame with multi-station addresses.

In some alternate embodiments, polling frame 101 (FIG. 1) may use field-bits or another technique to indicate the addresses and/or a set of subcarriers of a plurality of subcarriers of the multicarrier communication channel for wireless communication devices to use for simultaneous uplink transmissions.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, and flash memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier communication station comprising:
   receiver circuitry to generate baseband samples from uplink packets received from a plurality of transmitting stations; and
   baseband processing circuitry to determine time-of-arrival differences between the uplink packets received from the transmitting stations and to compensate Fourier coefficients associated with each of the transmitting stations based on the time-of-arrival differences,
   wherein the baseband processing circuitry comprises:
   a plurality of correlators to perform correlations on the baseband samples to determine the time-of-arrival differences, each correlator to perform the correlations with a preamble of the uplink packet associated with one of the transmitting stations.

2. The communication station of claim 1 wherein the baseband processing circuitry further comprises:
   peak detection and delay-estimation circuitry to identify peak correlation outputs from the correlators and to determine the time-of-arrival differences from the peak correlation outputs; and
   delay-compensation circuitry to phase-rotate Fourier coefficients based on the time-of-arrival differences associated with each transmitting station.

3. The communication station of claim 2 wherein the delay-compensation circuitry rotates a phase of the Fourier coefficients an amount opposite to a time-delay associated with the time-of-arrival differences.

4. The communication station of claim 2 wherein the baseband processing circuitry further comprises Fourier transform circuitry to generate the Fourier coefficients by performing a discrete Fourier transform on the baseband samples, the Fourier transform circuitry to generate a Fourier coefficient for each subcarrier of a plurality of subcarriers of a multicarrier communication channel.

5. The communication station of claim 4 wherein the receiver circuitry generates a set of baseband samples for each of a plurality of receive antennas,
   wherein the Fourier transform circuitry generates the Fourier coefficients from each of the sets of the baseband samples,
   wherein the baseband processing circuitry performs correlations on each set of baseband samples using preambles associated with each transmitting station, and
   wherein the peak detection and delay-estimation circuitry generate the time-of-arrival differences for each transmitting station by averaging time-of-arrival differences generated from each receive antenna.

6. The communication station of claim 4 wherein the uplink packets are received on a plurality of subcarriers of a multicarrier communication channel,
   wherein each transmitting station transmits a data portion of the uplink packet on the same subcarriers as the other transmitting stations, and
   wherein each transmitting station transmits the preamble of the uplink packet using a different set of subcarriers of the multicarrier communication channel.

7. The communication station of claim 5 wherein the baseband processing circuitry further comprises:
   a channel estimator to generate channel estimates for each transmitting station from the compensated Fourier coefficients; and
   spatial-channel decoding circuitry to decode and separate data transmitted by each transmitting station on the same frequency subcarriers of the multicarrier communication channel using the channel estimates for each transmitting station.

8. The communication station of claim 7 wherein the baseband processing circuitry further comprises demapping, deinterleaving and decoding circuitry to process decoded spatial data streams provided by the spatial-channel decoding circuitry to generate a bit stream corresponding to the data transmitting by each transmitting station.

9. The communication station of claim 7 wherein each transmitting station further transmits a second preamble portion of the uplink packet using subcarriers in a frequency interleaved manner with the subcarriers used by the other transmitting stations in transmitting the second preamble portion.

10. A method performed by a multicarrier receiver comprising:

determining time-of-arrival differences between uplink packets received from a plurality of transmitting stations;

compensating Fourier coefficients for each of the transmitting stations based on the time-of arrival differences; and receiving the uplink packets concurrently from each of the transmitting stations on subcarriers of a multicarrier communication channel, each transmitting station using the same set of subcarriers to transmit a data portion of the uplink packet, wherein the uplink packets include a preamble unique to one of the transmitting stations, wherein determining the time-of arrival differences comprises performing a plurality of correlations on baseband samples generated from the received uplink packets, each correlation being performed with the preamble associated with one of the transmitting stations, and wherein the method further comprises:

identifying peak correlation outputs from the correlations to determine the time-of arrival differences.

11. The method of claim 10 wherein compensating comprises rotating a phase of the Fourier coefficients an amount opposite to a time-delay associated with the time-of-arrival differences.

12. The method of claim 10 further comprising generating the Fourier coefficients by performing a discrete Fourier transform on the baseband samples to generate a Fourier coefficient for each subcarrier of the multicarrier communication channel.

13. The method of claim 12 further comprising generating a set of baseband samples for each of a plurality of receive antennas, wherein generating the Fourier coefficients comprises generating the Fourier coefficients from each of the sets of the baseband samples, wherein performing the correlations comprises performing the correlations on each set of baseband samples using preambles associated with each transmitting station, and wherein generating the time-of-arrival differences comprises generating the time-of-arrival differences for each transmitting station by averaging time-of-arrival differences generated from each receive antenna.

14. The method of claim 12 wherein receiving the uplink packets comprises receiving the uplink packets on a plurality of subcarriers of a multicarrier communication channel, wherein each transmitting station transmits a data portion of the uplink packet on the same subcarriers as the other transmitting stations, and wherein each transmitting station transmits the preamble of the uplink packet using a different set of subcarriers of the multicarrier communication channel.

15. The method of claim 13 further comprising:

generating channel estimates for each transmitting station from the compensated Fourier coefficients; and decoding and separating data transmitted by each transmitting station on the same frequency subcarriers of the multicarrier communication channel using the channel estimates for each transmitting station.

16. The method of claim 15 further comprises demapping and deinterleaving the separated data transmitted by each transmitting station to generate a bit stream corresponding to the data transmitted by each transmitting station.

17. The method of claim 15 wherein each transmitting station further transmits a second preamble portion of the uplink packet using subcarriers in a frequency interleaved manner with the subcarriers used by the other transmitting stations in transmitting the second preamble portion.

18. A multicarrier communication system comprising:

substantially omnidirectional antennas; and a multicarrier receiver comprising receiver circuitry to generate baseband samples from uplink packets received concurrently by the antennas from a plurality of transmitting stations, and baseband processing circuitry to determine time-of-arrival differences between the uplink packets received from the transmitting stations and to compensate Fourier coefficients associated with each of the transmitting stations based on the time-of-arrival differences, wherein the baseband processing circuitry comprises:

a plurality of correlators to perform correlations on the baseband samples to determine the time-of-arrival differences, each correlator to perform the correlations with a preamble of the uplink packet associated with one of the transmitting stations.

19. The system of claim 18 wherein the baseband processing circuitry further comprises:

peak detection and delay-estimation circuitry to identify peak correlation outputs from the correlators and to determine the time-of-arrival differences from the peak correlation outputs; and delay-compensation circuitry to phase-rotate Fourier coefficients based on the time-of-arrival differences associated with each transmitting station, wherein the delay-compensation circuitry rotates a phase the Fourier coefficients an amount opposite to a time-delay associated with the time-of-arrival differences.

20. The system of claim 19 wherein the baseband processing circuitry further comprises Fourier transform circuitry to generate the Fourier coefficients by performing a discrete Fourier transform on the baseband samples, the Fourier transform circuitry to generate a Fourier coefficient for each subcarrier of a plurality of subcarriers of a multicarrier communication channel.

21. A computer-readable storage medium that stores instructions for execution by one or more processors to perform operations comprising:

determining time-of-arrival differences between uplink packets received from a plurality of transmitting stations;

compensating Fourier coefficients for each of the transmitting stations based on the time-of arrival differences; and receiving the uplink packets concurrently from each of the transmitting stations on subcarriers of a multicarrier communication channel, each transmitting station using the same set of subcarriers to transmit a data portion of the uplink packet, wherein the uplink packets include a preamble unique to one of the transmitting stations, wherein determining the time-of arrival differences comprises performing a plurality of correlations on baseband samples generated from the received uplink packets, each correlation being performed with the preamble associated with one of the transmitting stations, and wherein the operations further comprise:

identifying peak correlation outputs from the correlations to determine the time-of-arrival differences.

* * * * *